(12) United States Patent
Zelesky

(10) Patent No.: US 6,283,708 B1
(45) Date of Patent: Sep. 4, 2001

(54) COOLABLE VANE OR BLADE FOR A TURBOMACHINE

(75) Inventor: Mark F. Zelesky, Coventry, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/453,649

(22) Filed: Dec. 3, 1999

(51) Int. Cl.$^7$ ........................................... B63H 1/14
(52) U.S. Cl. ................................................ 416/97 R
(58) Field of Search ....................... 415/115; 416/97 R

(56) References Cited

U.S. PATENT DOCUMENTS

| | | |
|---|---|---|
| 3,891,348 | 6/1975 | Auxier . |
| 3,930,748 | 1/1976 | Redman et al. . |
| 4,063,851 * | 12/1977 | Weldon ............................ 416/97 R |
| 4,162,136 * | 7/1979 | Parkes ............................ 416/97 R |
| 4,252,501 | 2/1981 | Peill . |
| 4,770,608 * | 9/1988 | Anderson et al. ............... 416/97 R |
| 5,156,526 | 10/1992 | Lee et al. ........................ 416/97 R |
| 5,193,980 | 3/1993 | Kaincz et al. ................... 416/97 |
| 5,356,265 | 10/1994 | Kercher . |
| 5,375,972 * | 12/1994 | Gray ................................ 415/115 |
| 5,405,242 * | 4/1995 | Auxier et al. ................... 415/115 |
| 5,458,461 | 10/1995 | Lee et al. . |
| 5,498,133 | 3/1996 | Lee . |
| 5,538,394 * | 7/1996 | Inomata et al. ................. 416/97 R |
| 5,577,889 * | 11/1996 | Terazaki et al. ................ 416/97 R |
| 5,591,002 * | 1/1997 | Cunha et al. ................... 415/115 |
| 5,624,231 | 4/1997 | Ohtomo et al. . |
| 5,660,524 * | 8/1997 | Lee et al. ........................ 416/97 R |
| 5,700,131 | 12/1997 | Hall et al. ....................... 416/97 R |
| 5,931,638 * | 8/1999 | Krause et al. ................... 416/97 R |
| 6,019,579 * | 2/2000 | Fukuno et al. .................. 416/97 R |
| 6,022,188 * | 2/2000 | Bancalari ........................ 415/115 |
| 6,142,734 * | 11/2000 | Lee ................................. 416/97 R |
| 6,206,637 * | 3/2001 | Aoki et al. ...................... 416/96 R |

FOREIGN PATENT DOCUMENTS

| | | | |
|---|---|---|---|
| 2381178 * | 10/1978 | (FR) | ................................. 416/97 R |
| 59-113204 * | 6/1984 | (JP) | ................................. 416/97 R |
| 5-195704 * | 8/1993 | (JP) | ................................. 416/97 R |

\* cited by examiner

Primary Examiner—John E. Ryznic
(74) Attorney, Agent, or Firm—Kenneth C. Baran

(57) ABSTRACT

A coolable vane (12) for a turbomachine includes an airfoil (16) with a pair of imperforate ribs (42, 44) that extend laterally across the airfoil. The ribs have suction side termini (52, 56) and pressure side termini (54, 58). The suction side termini chordwisely delimit a segment $S_S$ of the airfoil suction wall (28) so that the ribs and the suction wall segment bound an internal plenum (48) for distributing a pressurized coolant spanwisely through the interior of the airfoil. An array of film cooling holes (84) penetrates the suction wall segment and is the exclusive avenue for conveying coolant from the plenum to a working medium fluid flowpath. Accordingly, relatively low pressure coolant may be supplied to the plenum without the risk of backflow or spanwise discontinuities in the surface cooling film. In one specific embodiment of the invention, the suction side rib termini (52, 56) straddle a point of minimum fluid pressure along the suction surface (38) so that positive coolant flow and spanwise continuity of the cooling film can be realized with coolant of the lowest possible pressure and without exposing the suction wall segment $S_S$ to excessive stress.

10 Claims, 3 Drawing Sheets

COOLABLE VANE OR BLADE FOR A TURBOMACHINE

TECHNICAL FIELD

This invention relates to improvements in coolable stator vanes for turbomachines, and particularly to improvements that reduce the maximum stress on the vane walls, provide reliable thermal protection of the vane, and reduce the cost of the vane. The improvements are also applicable to coolable rotor blades.

BACKGROUND OF THE INVENTION

The turbine section of a gas turbine engine includes one or more arrays of stator vanes. Each vane includes a cambered airfoil having a convex suction wall and a concave pressure wall. The walls extend chordwisely from an airfoil leading edge to an airfoil trailing edge. When the vanes are installed in an engine, their airfoils span across a working medium fluid flowpath that carries a stream of hot, high pressure combustion gases discharged from the engine combustion chamber. Each vane also includes one or more internal coolant passageways, bounded at least in part by one of the airfoil walls. One or more spanwisely extending arrays of film cooling holes penetrate the airfoil walls to establish fluid communication between the passageways and the flowpath. A coolant, usually pressurized air extracted from an engine compressor, is introduced into the coolant passageways to cool the airfoils and protect them from the intense heat of the combustion gases. The coolant then discharges into the working medium flowpath by way of the film holes. The discharged coolant forms a protective cooling film over the exposed suction and pressure surfaces of the airfoil walls to inhibit heat transfer from the combustion gases to the airfoil.

The pressure of the coolant introduced into any internal coolant passageway must satisfy conflicting requirements. The coolant pressure must be high enough, relative to the flowpath (combustion gas) pressure, to ensure a positive outflow of coolant through the film holes and into the flowpath. Otherwise the hot combustion gases will backflow through the film holes and enter the coolant passageway. However, excessively high coolant pressure can lead to blowoff, a phenomenon in which discharged coolant penetrates forcibly into the stream of combustion gases rather than spreading out over the airfoil surface to establish a protective cooling film. Between these two extremes, care must be taken to reliably match the coolant pressure to the spanwise density of the film holes (quantity of film holes per unit length in the spanwise direction) at all engine operating conditions. If the coolant pressure is too modest for a given hole density, the coolant flow rate through the film holes will be inadequate to ensure spanwise continuity of the cooling film. This, in turn, leads to undesirable hot spots on the airfoil surface. However, if the coolant pressure is too high for the existing hole density, the vane will use an excessive amount of coolant. Since the coolant is pressurized by energy absorbed from an engine compressor, the excessive use of coolant degrades engine efficiency and increases engine fuel consumption. Of course, the airfoil designer can specify a hole density high enough to minimize the likelihood of cooling film discontinuities, even when the engine is operating at conditions where the compressor supplies the coolant at a relatively low pressure. However, the dense hole array is likely to use an objectionable quantity of coolant when the engine is operated at other conditions where the compressor supplies relatively high pressure coolant. Conversely, the designer can specify a low density hole array to ensure economical use of coolant at high pressure, but only at the risk of introducing cooling film discontinues at conditions where the compressor supplies lower pressure coolant. Finally, elevated coolant pressure imposes high stresses on the airfoil walls since the stresses are proportional to the difference between coolant pressure and flowpath pressure. These high stresses dictate the use of exotic materials that possess high strength, but are exorbitantly expensive.

In some vanes, the arrangement of coolant passageways and film holes complicates efforts to satisfy the foregoing constraints. One such example is a vane with a coolant passageway and two sets of film holes—one set venting the passageway to a relatively low flowpath pressure adjacent the suction surface of the vane, and the other set venting the passageway to a relatively high flowpath pressure adjacent the pressure surface of the vane. A coolant whose pressure is low enough to prevent blowoff and excessive coolant usage at the suction surface of the vane may not provide adequate backflow margin or spanwise film continuity at the pressure surface. Conversely, a higher coolant pressure may improve backflow margin and film continuity at the pressure surface but may encourage blowoff and excessive coolant usage at the suction side.

One way to contend with disparate flowpath pressures along the suction and pressure surfaces of an airfoil is shown in U.S. Pat. No. 5,365,265. The disclosed turbine blade includes a chordwisely extending septum 48 that bifurcates a leading edge channel 46 into independent pressure side and suction side chambers 46a, 46b. Appropriately sized metering holes 72, 74 meter compressed air into the chambers to ensure sufficient backflow margin across film holes 50, 52, 54 while guarding against blowoff of the film cooling air issuing from holes 52. The disclosed blade also includes a visually similar arrangement of chambers 38a, 38b segregated by another chordwisely extending septum 40. Unfortunately, the septa 40, 48 have the potential to complicate blade manufacture and can make the blade susceptible to thermo-mechanical fatigue since the septa do not expand and contract as much as the external walls 20, 22 in response to changes in the temperature of the combustion gases 34.

What is needed is a coolable turbomachinery airfoil that resists both backflow and blowoff, makes efficient use of coolant, does not jeopardize spanwise continuity of the cooling film, is not overly vulnerable to thermo-mechanical fatigue, and has reduced wall stress so that the use of less exotic, more cost effective materials is a viable option.

SUMMARY OF THE INVENTION

According to one aspect of the invention, a coolable vane or blade for a turbomachine includes an airfoil with a pair of imperforate ribs that extend laterally across the airfoil. The ribs have suction side termini and pressure side termini. The suction side termini chordwisely delimit a segment of the airfoil suction wall so that the ribs and the suction wall segment bound an internal plenum for distributing a pressurized coolant spanwisely through the interior of the airfoil. An array of film cooling holes penetrates the suction wall segment and is the exclusive avenue for conveying coolant from the plenum to a working medium fluid flowpath. Accordingly, relatively low pressure coolant may be supplied to the plenum without the risk of backflow or spanwise discontinuities in the surface cooling film.

According to a second aspect of the invention, the pressure side rib termini delimit an imperforate segment of the pressure wall so that the coolant plenum is bounded by the ribs, the suction wall segment and the imperforate pressure wall segment. In one embodiment of the second aspect of the invention, the imperforate segment is chordwisely short enough to be effectively cooled by an unreplenished cooling film originating chordwisely forwardly of the plenum.

In other embodiments of the invention, the suction side rib termini straddle a point of minimum fluid pressure along the suction surface so that positive coolant flow and spanwise continuity of the cooling film can be realized with coolant of the lowest possible pressure and without exposing the suction wall segment to excessive stress.

BRIEF DESCRIPTION OF THE DRAWINGS

FIG. 5 is a view similar to that of FIG. 3 showing a variation of the invention in which the pressure side rib termini are offset from the airfoil pressure wall.

FIG. 6 is a view similar to that of FIG. 3 showing another aspect of the invention having a quadrilateral medial plenum.

BEST MODE FOR CARRYING OUT THE INVENTION

Figure 1:
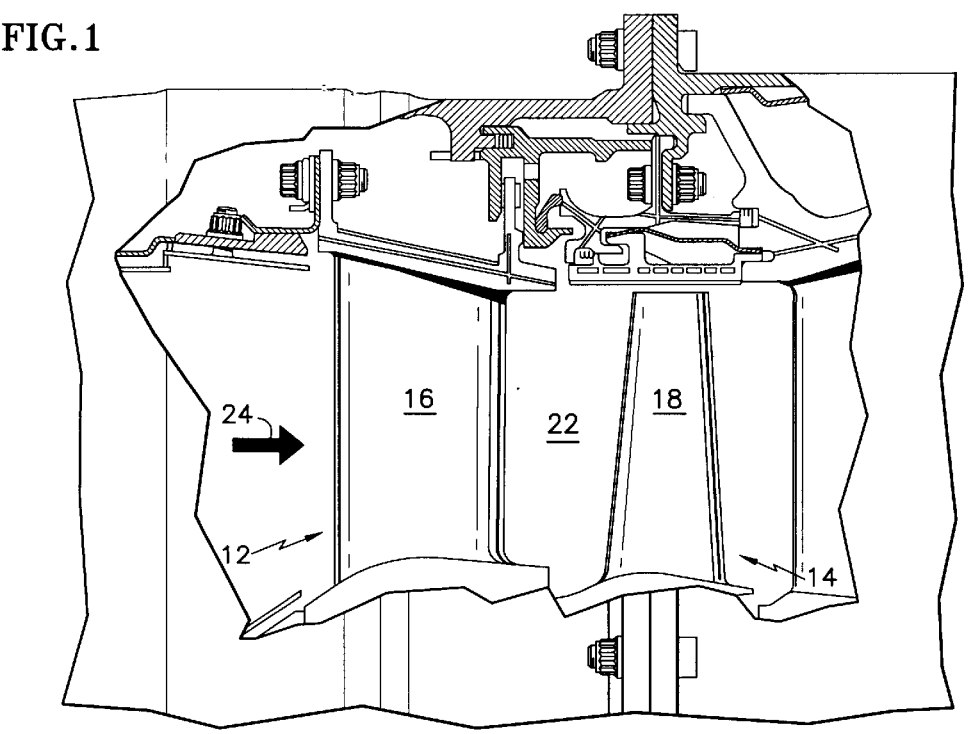
FIG. 1 shows a turbine section of an aircraft gas turbine engine with the turbine casing partially broken away to expose a representative turbine vane and a representative blade.

FIG. 1 shows the turbine section of a gas turbine engine. The internal elements of the turbine include an array of stator vanes 12 and an array of rotor blades 14. The blades and vanes each include an airfoil section 16, 18 that spans radially across a working medium fluid flowpath 22. During engine operation, a stream of working medium fluid 24 (combustion gases) flows axially through the turbine. The vanes and blades, which are collectively referred to as fluid reaction elements, interact with the combustion gas stream to extract energy from the stream. The present invention is described in the context of a stator vane 12, but may be applied to a rotor blade as well.

Figure 2:
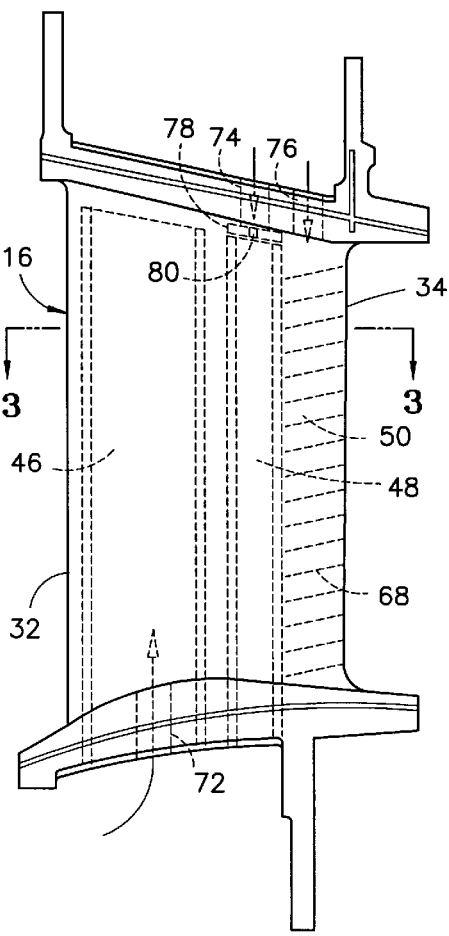
FIG. 2 shows a side view of a turbine vane of the present invention with an airfoil having forward, medial and aft coolant plenums.
Figure 3:
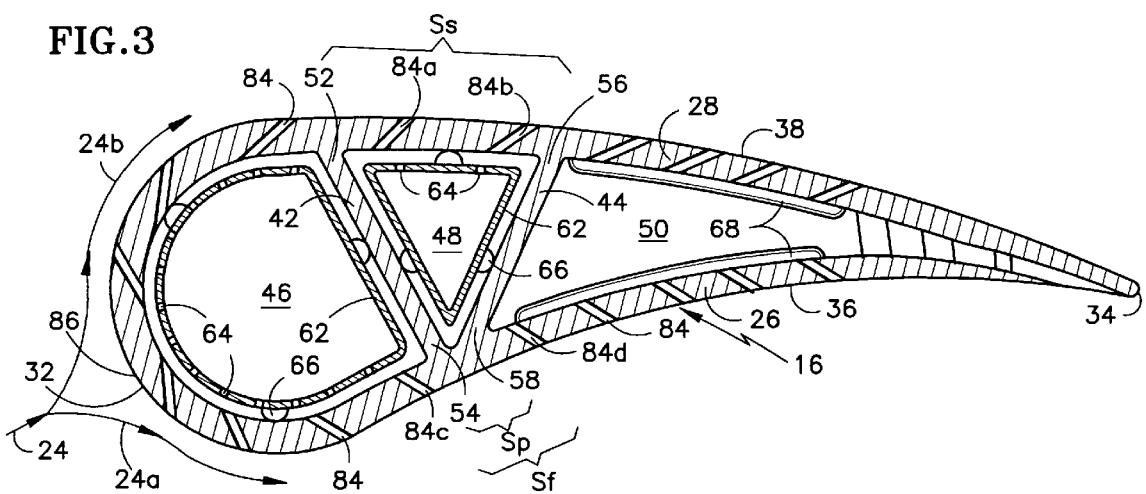
FIG. 3 is a view taken in the direction 3—3 of FIG. 2 showing an embodiment of the invention in which the medial plenum is bounded by a segment of the suction wall and by a pair of laterally extending ribs whose pressure side termini form a juncture with the airfoil pressure wall.

FIGS. 2 and 3 illustrate a typical stator vane 12 of the invention. The airfoil 16 of each vane includes a concave pressure wall 26 and a convex suction wall 28, each extending from an airfoil leading edge 32 to an airfoil trailing edge 34. The walls 26, 28 have respective pressure and suction surfaces 36, 38 exposed to the working medium flowpath.

Forward and aft imperforate ribs 42, 44 extend laterally across the airfoil and converge toward each other as they approach the pressure wall. The ribs cooperate with the airfoil walls to define a forward plenum 46, a medial plenum 48 and an aft plenum 50 for distributing coolant throughout the interior of the airfoil. The forward rib 42 has a suction side terminus 52 that forms a juncture with the suction wall and a pressure side terminus 54 that forms a juncture with the pressure wall. The aft rib 44 has similar suction side and pressure side termini 56, 58 forming respective junctures with the suction and pressure walls. The suction side termini 52, 56 chordwisely delimit a segment $S_S$ of the suction wall. The medial plenum 48 is thus bounded by the ribs 42, 44 and by the segment $S_S$ of the suction wall. The forward plenum 46 is bounded by the forward rib 42 and the forwardmost portions of the pressure and suction walls. The aft plenum 50 is bounded by the aft rib 44 and the aftmost portions of the pressure and suction walls.

The forward and medial plenums 46, 48 each include a sheet metal impingement insert 62 perforated by impingement cooling holes 64. Local standoffs 66 on the inserts space each insert from the airfoil walls and from the ribs 42, 44. The aft plenum is lined with trip strips 68 integrally cast on the pressure and suction walls. Forward, medial and aft coolant inlets 72, 74, 76 (FIG. 2) admit coolant into each of the plenums. The inlet 74 is configured to depressurize coolant admitted to the medial plenum 48. In the illustrated vane, depressurization is effected by a metering plate 78 with a metering orifice 80. Spanwisely extending arrays of film cooling holes 84 penetrate the airfoil walls to establish fluid communication between the plenums and the flowpath.

During engine operation, pressurized coolant, which is usually pressurized air extracted from an engine compressor, flows into each plenum by way of the coolant inlets. In the illustrated vane, the forward plenum is supplied with coolant (air) extracted from the radially inner extremity of an axial flow compressor. The medial and aft plenums are supplied with air extracted from the radially outer extremity of the compressor. The source pressure for the coolant streams may be the same or may be different. The metering plate 78 depressurizes the coolant entering the medial plenum. The coolant flows spanwisely into the forward and medial plenums 46, 48 where the impingement cooling holes 64 in the inserts 62 direct individual jets of coolant against the airfoil walls 26, 28 to impingement cool the walls. The coolant then discharges into the flowpath by way of the arrays of film holes 84 and, ideally, spreads out over the airfoil surfaces to establish a protective coolant film. Coolant flowing spanwisely into the aft plenum 50 convectively cools the airfoil walls aft of the medial plenum. The trip strips 68, which are skewed relative to the predominantly spanwise direction of coolant flow, impart turbulence to the coolant to improve its effectiveness as a convective cooling medium. The coolant then discharges into the flowpath through the film holes 84 to form a cooling film as already described.

During engine operation, each airfoil divides the oncoming combustion gas stream 24 into pressure and suction side substreams 24a, 24b flowing respectively over the airfoil pressure and suction surfaces 36, 38. The substreams originate at a stagnation point 86 located at or near the airfoil leading edge 32. The gas stream has a stagnation or total pressure $P_t$, which is the pressure that would exist if the gas stream could be isentropically decelerated to zero velocity.

Figure 4:
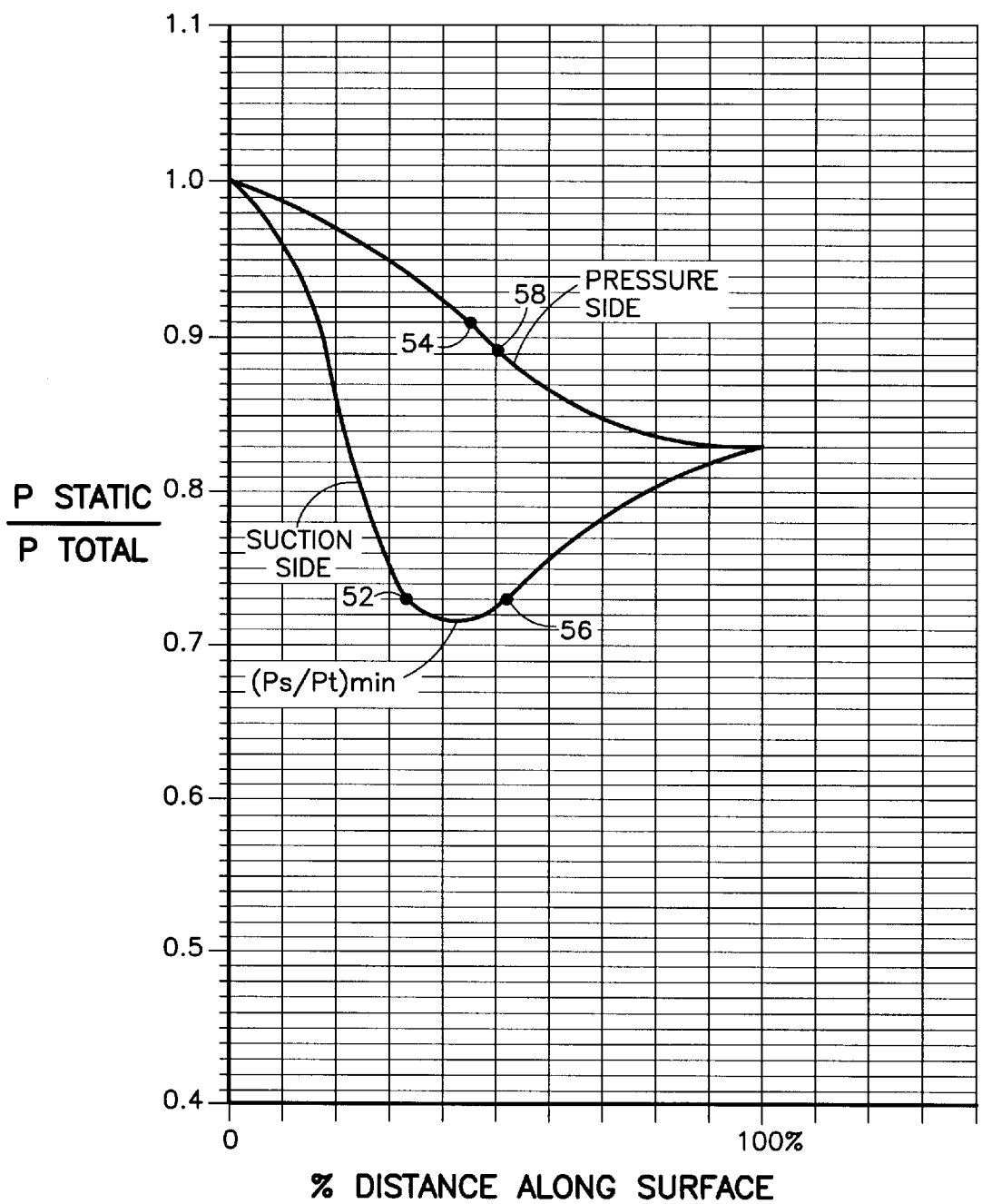
FIG. 4 is a graph showing typical fluid pressure profiles along the suction and pressure surfaces of a turbine airfoil with the chordwise locations of airfoil rib termini superimposed on the graph.

FIG. 4 shows the static pressure profile of the combustion gas substreams flowing along the pressure and suction surfaces of a typical turbine vane airfoil at a predefined operating condition of the engine. The static pressure depicted in the Figure is normalized to the stagnation pressure and expressed as a function of percentage distance along the surface of interest. Static pressure along the pressure surface diminishes continuously from the leading edge to the trailing edge. Static pressure along the suction surface diminishes to a minimum value $(P_s P_t)_{min.}$ at a point partway along the suction surface and then recovers to a higher value at the trailing edge.

As is evident from FIG. 4, flowpath fluid pressure changes considerably along both the pressure and suction surfaces. Therefore, a plenum may communicate, by way of its film holes, with regions of widely disparate fluid pressure. Accordingly, it may be difficult to satisfy the conflicting requirements of backflow resistance, blowoff resistance, good spanwise film continuity and economical use of cooling air. This is particularly true for plenums that vent to both the pressure and suction sides of the airfoil, especially those plenums that are remote from the leading and trailing edges where the pressure difference between the pressure and suction sides is largest.

Referring now to FIGS. 3 and 4, the vane according to the present invention addresses the above described difficulties. The suction side rib termini 52, 56 chordwisely delimit a segment $S_S$ of the suction wall and chordwisely straddle the point $(P_s/P_t)_{min.}$ of minimum flowpath fluid pressure along the suction wall. Ideally the termini 52, 56 chordwisely coincide with approximately equal values of static pressure along the suction wall so that there is little variation in flowpath pressure along the delimited segment. The ribs themselves converge toward each other as they approach the pressure wall so that the medial coolant plenum is essentially a three sided plenum bounded exclusively by the ribs 42, 44 and by the segment $S_S$ of the suction wall delimited by rib termini 52, 56.

One or more arrays of film cooling holes, such as holes 84a, 84b penetrate the suction wall segment $S_S$ to vent the medial plenum directly to the fluid flowpath 22, and are the exclusive avenue for conveying coolant from the plenum to the flowpath. Since the medial plenum 48 is vented only to the suction side of the airfoil, coolant of relatively low pressure may be supplied to the plenum without appreciable risk of backflow or cooling film discontinuities. Moreover, the absence of high pressure coolant in plenum 48 contributes to uncustomarily low stresses on the airfoil suction wall segment $S_S$. As a result, the vane may be constructed of a relatively low strength, low cost alloy, for example a cobalt base alloy, rather than a directionally solidified, single crystal nickel base alloy. Alternatively, a higher strength, more costly alloy may be used, allowing wall segment $S_S$ to be atypically long without the risk of unacceptable deflection (bulging) of the wall or risk of structural failure.

Because the medial plenum 48 does not supply cooling air to the pressure side of the airfoil, the pressure wall segment $S_P$ delimited by rib termini 54, 58 necessarily has a limited chordwise length. Likewise, the slightly longer wall segment $S_f$ chordwisely bounded by the discharge ends of the forward and aft film hole arrays 84c, 84d also has a limited chordwise length. In particular, the segments $S_P$, $S_f$ are chordwisely short enough that the cooling film established by coolant discharging from hole array 84c can thermally protect segment $S_f$ without being replenished by additional coolant. In particular, it is advisable that the loss of film cooling effectiveness per unit distance along wall segment $S_f$ should be approximately no more than the highest loss of film cooling effectiveness per unit distance between any two other adjacent arrays of film holes along the pressure wall of the vane. Alternatively, the cooling film attributable to hole array 84c should ensure that the temperature of wall segment $S_f$ does not appreciably exceed the wall temperature elsewhere on the airfoil.

The number and location of the cooling hole arrays that penetrate wall segment $S_S$ depend on competing considerations of cooling capability and turbine efficiency. The best cooling is obtained by using a large number of hole arrays. However, the introduction of coolant into the gas stream from each cooling hole array introduces momentum losses and causes attendant inefficiencies in the transfer of energy from the gas stream to the turbine. Because these inefficiencies are cumulative, it may be advisable to trade away some cooling capability in return for enhanced efficiency by using fewer arrays of film holes. Moreover, the momentum loss mechanisms are more powerful where the combustion gas velocities are higher (i.e. where $P_t/P_s$ is lower). Consequently, from the standpoint of turbine efficiency, it is preferable to position the discharge ends of the holes where the combustion gas velocity is relatively low (i.e. where $P_t/P_s$ is relatively high). Since the gas velocity increases as the combustion gases flow over the more forward (upstream) portions of the suction surface, a film hole array at a more upstream location, like hole array 84a, is preferred over a film hole array at a more downstream location, like array 84b.

Using a reduced quantity of film hole arrays on the suction surface is also justifiable because as the hot combustion gases flow over the airfoil surfaces, they mix with the cooling film, diminishing the film effectiveness. These mixing losses are less pronounced where the gas velocities are higher. Therefore, the suction side of the blade, where the velocities are higher than on the pressure side of the blade, is less susceptible to decay of film effectiveness and so is more tolerant of extensive chordwise spacing between the film hole arrays.

In the vane of FIG. 3, two arrays of holes 84a, 84b are used to achieve the best possible cooling. However one array, preferably array 84b, may be eliminated to help improve efficiency.

FIG. 5 illustrates a variant of the vane in which the rib termini 54, 58, rather than forming a juncture with the pressure wall 26, are laterally offset therefrom by a small rail 88 that extends from the rib termini to the wall. The rail may be introduced intentionally if desired. However it is more likely to be an unintended but benign byproduct of casting imprecisions during vane manufacture. In all other substantive respects, the vane of FIG. 5 is analogous to the vane depicted in FIG. 3.

FIG. 6 illustrates a vane according to another aspect of the invention. In the illustrated vane, the ribs 42, 44 converge toward each other as they approach the pressure wall, and the pressure side termini 54, 58 chordwisely delimit an imperforate segment $S_P$ of the pressure wall. The ribs, 42, 44, the suction wall segment $S_S$ and the imperforate pressure wall segment $S_P$ bound a quadrilateral medial plenum 48. Because of the absence of film holes through the pressure wall segment, the delimited segment $S_P$ and the segment $S_f$ bounded by hole arrays 84c, 84d have a limited chordwise length as described above in connection with the embodiment of FIG. 3.

The vane may be conventionally manufactured by casting the vane in a foundry and then finish machining the vane to its final shape. A metallic or a metallic and ceramic thermal barrier coating may be applied to the flowpath exposed surfaces to extend the service life of the vane. The cooling holes are installed by laser drilling, mechanical drilling or electro-discharge machining.

The above described airfoil offers a number of advantages. Because coolant from medial plenum 48 vents only to the suction side of the airfoil, blowoff resistance and economical coolant use need not be compromised by using coolant pressurized sufficiently to satisfy backflow and cooling film continuity constraints along the pressure side of the airfoil. Since coolant pressure is low, the spanwise density of the cooling hole arrays that vent the medial plenum can be made relatively high, thereby ensuring spanwise film continuity without degrading engine efficiency. Use of low pressure coolant also exposes the suction wall segment $S_S$ to correspondingly low mechanical stress so that the airfoil designer can take advantage of low cost materials or, alternatively, can make the suction wall segment $S_S$ longer than would otherwise be possible. In addition, the disclosed airfoil avoids the use of chordwisely extending septa that may complicate manufacture and may be susceptible to thermo-mechanical fatigue.

I claim:

1. A coolable fluid reaction element for a turbomachine, comprising:
    an airfoil having a pressure wall and a suction wall, each wall extending from an airfoil leading edge to an airfoil trailing edge, the walls having respective pressure and suction surfaces exposed to a stream of fluid in a fluid flowpath;
    forward and aft imperforate ribs extending laterally across the airfoil, each rib having a suction side terminus and a pressure side terminus, the suction side termini chordwisely delimiting a segment of the suction wall;
    an internal plenum for distributing a pressurized coolant, the plenum bounded by the ribs and the suction wall segment; and
    at least one array of cooling holes penetrating the suction wall segment, the at least one hole array being the exclusive avenue for conveying coolant from the plenum to the fluid flowpath.

2. A coolable fluid reaction element for a turbomachine, comprising:
    an airfoil having a pressure wall and a suction wall, each wall extending from an airfoil leading edge to an airfoil trailing edge, the walls having respective pressure and suction surfaces exposed to a stream of fluid in a fluid flowpath;
    forward and aft imperforate ribs extending laterally across the airfoil, each rib having a suction side terminus and a pressure side terminus, the suction side termini chordwisely delimiting a segment of the suction wall and the pressure side termini chordwisely delimiting an imperforate segment of the pressure wall;
    an internal plenum for distributing a pressurized coolant, the plenum bounded by the ribs and the delimited wall segments; and
    at least one array of cooling holes penetrating the suction wall segment, the at least one hole array being the exclusive avenue for conveying coolant from the plenum to the fluid flowpath.

3. The fluid reaction element of claim 2 wherein the delimited pressure wall segment has a chordwise length and the pressure wall also includes a segment bounded by film hole arrays forward and aft of the pressure side termini that discharge coolant into the flowpath so that the coolant establishes a protective cooling film along the pressure surface, the chordwise length of the bounded segment being short enough that the coolant film established by the forward hole array thermally protects the bounded segment without being replenished by additional coolant.

4. The fluid reaction element of claim 3 wherein the cooling film established by the forward film hole array has a cooling effectiveness whose decay per unit distance in the chordwise direction is no more than the largest chordwise decay per unit distance in cooling effectiveness between any two other adjacent arrays of film holes along the pressure wall of the airfoil.

5. The fluid reaction element of claim 3 wherein the cooling film established by the forward film hole array maintains the bounded segment at a temperature that does not appreciably exceed the temperature of the airfoil walls elsewhere on the airfoil.

6. The fluid reaction element of claim 1 or 2 wherein the suction side rib termini straddle a point of minimum fluid pressure along the suction surface.

7. The fluid reaction element of claim 6 wherein the suction side rib termini chordwisely coincide with locations of approximately equal flowpath fluid pressure.

8. The fluid reaction element of claim 1 or 2 wherein the plenum includes a coolant inlet configured to depressurize coolant admitted into the plenum.

9. A coolable fluid reaction element for a turbomachine, comprising:
    an airfoil having a pressure wall and a suction wall, each wall extending from an airfoil leading edge to an airfoil trailing edge, the walls having respective pressure and suction surfaces exposed to a stream of fluid in a fluid flowpath;
    forward and aft imperforate ribs extending laterally across the airfoil, each rib having a suction side terminus and a pressure side terminus, the suction side termini chordwisely delimiting a segment of the suction wall and straddling a point of minimum fluid pressure along the suction surface, the ribs converging toward the pressure wall so that the ribs cooperate with the suction wall to define a three sided plenum for distributing a pressurized coolant; and
    at least one array of cooling holes penetrating the suction wall segment, the at least one hole array being the exclusive avenue for conveying coolant from the plenum to the fluid flowpath.

10. The fluid reaction element of claim 1 or 2 wherein the pressure side rib termini are laterally offset from the pressure wall by a rail.

* * * * *